United States Patent [19]
Mitsuoka et al.

[11] Patent Number: 5,671,107
[45] Date of Patent: Sep. 23, 1997

[54] LARGE CAPACITY MAGNETIC DISC APPARATUS WITH A PARTICULAR RELATIONSHIP BETWEEN POLE THICKNESS, SATURATED FLUX DENSITY, AND RECORDING WAVELENGTH

[75] Inventors: Katsuya Mitsuoka; Hiroshi Fukui, both of Hitachi; Makoto Aihara, Katsuta; Masanori Tanabe; Moriaki Fuyama, both of Hitachi; Shinji Narishige, Mito; Yutaka Sugita, Tokorozawa; Yoshihiro Shiroishi, Hachioji; Hajime Aoi, Tachikawa; Yokuo Saitoh, Kanagawa-ken; Kanji Kawakami, Mito; Yoshikazu Tsuji, Kanagawa-ken; Masaaki Hayashi; Kazuo Nakagoshi, both of Odawara, all of Japan

[73] Assignee: Hitachi, Ltd., Tokyo, Japan

[21] Appl. No.: 399,221

[22] Filed: Mar. 6, 1995

Related U.S. Application Data

[63] Continuation-in-part of Ser. No. 52,285, Apr. 26, 1993, abandoned, which is a continuation of Ser. No. 620,631, Dec. 3, 1990, abandoned.

[30] Foreign Application Priority Data

Dec. 13, 1989 [JP] Japan ..................................... 1-321445

[51] Int. Cl.$^6$ ..................... G11B 5/012; G11B 5/31; G11B 5/60
[52] U.S. Cl. .................. 360/126; 360/98.01; 360/103
[58] Field of Search ........................ 360/97.01, 98.01, 360/103–106, 113, 125, 126, 135

[56] References Cited

U.S. PATENT DOCUMENTS

| | | | |
|---|---|---|---|
| 4,432,025 | 2/1984 | Grogan | 360/48 |
| 4,895,758 | 1/1990 | Sakemoto et al. | 360/125 |
| 4,933,785 | 6/1990 | Morehouse et al. | 360/105 |
| 5,109,311 | 4/1992 | Hanazono et al. | 360/119 |
| 5,134,038 | 7/1992 | Baseman et al. | 428/611 |
| 5,218,497 | 6/1993 | Tanabe et al. | 360/113 |
| 5,278,712 | 1/1994 | Sugaya | 360/104 |

FOREIGN PATENT DOCUMENTS

| | | |
|---|---|---|
| 57-210403 | 12/1982 | Japan . |
| 58-194125 | 11/1983 | Japan . |
| 60133501 | 12/1983 | Japan . |
| 63-222404 | 1/1989 | Japan . |
| 1321445 | 12/1989 | Japan . |

OTHER PUBLICATIONS

J. Appl. Phys. 61(8) 15, Apr. 1987; pp. 4157–4162 4. "Design and fabrication of thin–film head based on . . . ".
IEEE Transactions on Magnetics, vol.25, No.5, Sep., 1989, pp. 3194–3196.
IEE Transactions on Magnetics, vol.215, No.5, Sep., 1989, pp. 3683–3685.
Journal of Applied Physics 61(8), 15 Apr. 1987, pp. 4182–4184.
Perpendicular . . . Density, Katz et al., Computer Library Periodicals, Jan. 1989, Doc. #34660.
Computergram International, Nov. 1989, Rec# 07864486.

*Primary Examiner*—Jefferson Evans
*Attorney, Agent, or Firm*—Antonelli, Terry, Stout & Kraus, LLP.

[57] ABSTRACT

A magnetic disc apparatus has a large recording density of 120 megabits per square inch or more, and defines a relationship among a pole thickness (Pt) of thin-film magnetic heads disposed in the magnetic disc apparatus, and a saturation flux density (Bs) of cores of the heads and a recording wavelength ($\lambda$) for the thin film magnetic discs have a coercivity of 1800 Oe or more, wherein a levitation space between the head and the disc is 0.15 μm or less.

15 Claims, 11 Drawing Sheets

SMALL P_T
WEAK MAGNETIC FIELD

LARGE P_T
STRONG MAGNETIC FIELD

LARGE CAPACITY MAGNETIC DISC APPARATUS WITH A PARTICULAR RELATIONSHIP BETWEEN POLE THICKNESS, SATURATED FLUX DENSITY, AND RECORDING WAVELENGTH

CROSS-REFERENCE TO RELATED APPLICATION

This is a continuation-in-part application of U.S. Ser. No. 08/052285 filed on Apr. 26, 1993 and now abandoned which in turn, is a continuation of U.S. Ser. No. 07/620,631 filed Dec. 3, 1990, and now abandoned. The disclosure of that application is incorporated therein by reference.

BACKGROUND OF THE INVENTION (a) Field of the Invention

This invention relates to a magnetic disc apparatus and an information recording/reproducing method, and more particularly, to a large capacity magnetic disc apparatus suitable for use as an external storage apparatus for a computer, a thin-film magnetic head for use in the magnetic disc apparatus and an information read/write method for the magnetic disc apparatus.

(b) Description of the Related Arts

With an increase in a storing capacity of computers, a storing capacity of magnetic disc apparatus tends to be also increased more and more.

As a prior art of a magnetic disc apparatus, for example, Official Gazette of Laid-open Japanese Patent Application No. 60-133501 describes that a magnetic head comprising a plurality of magnetic head cores mounted on a slider is used to record in outer and inner peripheral areas at the same line density, thereby making it possible to record on outer peripheral tracks at a high recording density similar to that of inner peripheral tracks of a magnetic disc. Also, Official Gazette of laid-open Japanese Patent Application N. 57-210403 describes that the capacity of each of a plurality of tracks of on a magnetic disc is optimized by writing data thereon at different frequencies to thereby enhance the storing capacity as a whole.

Either of the above-mentioned prior arts of the magnetic disc apparatus is intended to enhance the recording capacity of a magnetic disc, and does not investigate how to construct the apparatus for enhancing the recording capacity of the whole magnetic disc apparatus.

SUMMARY OF THE INVENTION (a) Objects of the Invention

It is an object of the present invention to clarify an essential construction of a magnetic disc apparatus having a total storing capacity of 60 gigabytes, particularly a capacity ranging from 60 to 120 gigabytes and provide such large capacity magnetic disc apparatus.

It is another object of the present invention to provide a thin-film magnetic disc suitable for use in magnetic disc apparatus having a storing capacity of 60 gigabytes or more.

It is a further object of the present invention to provide a thin-film magnetic head suitable for use in magnetic disc apparatus having a storing capacity of 60 gigabytes or more.

It is a still further object of the present invention to provide an information recording/reproducing method for the above-mentioned magnetic disc apparatus.

It is a still another object of the present invention to provide a construction of a magnetic disc apparatus using a thin-film disc with the coercivity of 1800 Oe or more under a levitation space of 0.15 µm or less, and a thin-film head suitable for the present invention.

It is a still further object of the present invention to provide a construction of a magnetic disc apparatus having a recording density of 120 to 900 megabits per square inch.

(b) Statement of the Invention

A magnetic disc apparatus of the present invention is provided with one or more head disc assemblies having one or more thin-film magnetic discs coaxially mounted on a single rotating shaft and a thin-film head for writing and reading information on and from the thin-film magnetic discs. The thin-film magnetic discs each having a track density of 1800 tracks per inch or more and a line recording density of 70 kilobits or more, and also has the above-mentioned rotating shaft driving means for rotating the innermost periphery of the thin-film magnetic discs at a peripheral velocity of 3 m per second or more.

The present invention is based on a concept that it is necessary to increase the surface recording density of a thin-film magnetic disc and speed up a data transfer velocity for enhancing the storing capacity without remarkably enlarging a magnetic disc apparatus in size.

It has been found that if a thin-film magnetic disc has a surface recording density of 120 to 900 megabits per square inch and if a data transfer velocity ranges between 6 and 9 megabytes per second, the total storing capacity of a magnetic disc apparatus can be enhanced to 60 to 120 gigabytes. To achieve such a surface recording density, a data transfer velocity and a large storing capacity, we have been found it desirable to apply the above-mentioned track density, line recording density and disc peripheral velocity to the magnetic disc apparatus. It has also been found that writing and reading operations can be performed with the above-mentioned thin-film magnetic disc if an employed thin-film magnetic disc satisfies the following formula in a recording wavelength range between 0.3 and 0.97 µm:

$$P_T \cdot B_S \geq \frac{(\sqrt{\lambda}+3.6)(10\lambda-4\sqrt{\lambda}+8.6)}{13(2.5\sqrt{\lambda}-1)}$$

where $P_T$ represents a pole thickness, $B_S$ a saturated flux density of a magnetic head core and $\lambda$ a recording wavelength.

A magnetic disc apparatus generally employed for a computer as an external storage apparatus is in many cases installed on a floor area, all sides of which have a length of 0.5 to 1.5 meters and accommodated in a space within a height of two meters. It is therefore desirable to accommodate a magnetic disc apparatus within the above-mentioned space as well as enhance the recording capacity of the same.

The track density and line recording density of a thin-film magnetic disc defined by the present invention are extremely important to achieve a storing capacity of 60 gigabytes or more within the above specified space.

It is desirable in the present invention to form a head disc assembly with one or more disc shaped thin-film magnetic discs coaxially mounted on a single rotating shaft, and to constitute a magnetic disc apparatus of one or more of these head disc assemblies. Preferably, the diameter of the thin-film magnetic discs each range from 1 to 11 inches. With this size of thin-film magnetic discs, it is possible to accommodate eight head disc assemblies within a space with all sides of a floor area being 0.5 to 1.5 m and a height of approximately 2 m.

If the diameter of the thin-film magnetic disc is less than one inch, the line recording density should be enhanced, which results in difficulties in recording and reproducing. On the contrary, if it is more than one inch, the mounting density of the thin-film magnetic disc cannot be increased, and also difficulties are present in enhancing a sliding velocity of the thin-film magnetic disc. The above-mentioned thin-film magnetic disc having a diameter between 1 and 11 inches is remarkably effective in increasing the surface recording density thereof and speeding up the data transfer velocity.

When a magnetic disc apparatus is provided with eight head disc assemblies, each of them needs to have a storing capacity of approximately 7.5 gigabytes or more to provide a total storing capacity of 60 gigabytes or more. Assuming that both front and rear surfaces of each thin-film magnetic disc, that is, the whole available 15 surfaces are to be utilized for writing information thereon, the storing capacity per surface is approximately 0.5 gigabytes or more. A region of the thin-film magnetic disc actually utilized for writing information is no more than approximately 4 cm from the outer periphery. To achieve a storing capacity of 0.5 gigabytes by the use of such a thin-film magnetic disc, it is required to have a track density of 1800 track per inch or more and a line recording density of 70 kilobits per inch or more.

Even with a magnetic disc apparatus provided with a largely increased storing capacity, if it takes a long time for writing and reading information, such large capacity disc apparatus offers no merit or practically no merit. It is therefore necessary to speed up an information writing and reading velocity, that is, the data transfer velocity, in parallel with increasing the storing capacity. To achieve a storing capacity of 60 to 120 gigabytes for a magnetic disc apparatus having thin-film magnetic discs, the surface recording density of which ranges from 120 to 900 megabits per square inch, a data transfer velocity of 6 to 9 megabytes per second, is desired. Such a high data transfer velocity makes it possible to largely increase the storing capacity without causing a delay in information processing.

The surface recording density is expressed by the product of the track density and the line recording density, and the data transfer velocity by the line recording density and the peripheral velocity of the thin-film magnetic disc.

To achieve a track density of 1800 tracks per inch with a thin-film magnetic disc having a diameter of 3.5 to 11 inches, a pitch between adjacent tracks is required to be 14.1 μm or less. However, since a guard band of approximately 1 to 4 μm is preferably provided for preventing mutual interference between adjacent tracks, the track width is preferably 11 μm or less.

A data access time (a positioning time) is also required to be reduced with the increase of the data transfer velocity. In the present invention, an average data access time of 10 ms or less is desired. Preferably, a disc rotating velocity and a rotational delay of the thin-film magnetic head are respectively determined to be 3500 rpm or more and 10 ms or less on the average in consideration of the relation with the data transfer velocity. The rotational delay means a time period during which the thin-film magnetic head moved to a predetermined track position of the thin-film magnetic disc is waiting for the disc to be rotated until a predetermined location of the track is positioned to the head for writing information thereon or reading information therefrom.

To achieve a large capacity magnetic disc apparatus of the present invention, a structure of the thin-film magnetic disc plays a very important role.

The thin-film magnetic disc is generally formed by sputtering a magnetic film or depositing the same by other means such as plating on at least one surface of a non-magnetic substrate such as aluminum, wherein the thickness and coercive force are important.

Specifically explaining, a line recording density of 60 kilobits per inch or more corresponds to approximately 0.97 μm or less in the recording wave-length. A flux reversal width α of the thin-film magnetic disc has a relationship roughly expressed by:

$$\alpha \propto t_{mag} \cdot Mr/Hc$$

where $t_{mag}$ represents a magnetic film thickness, Mr a residual magnetism of a magnetic film, and Hc a coercive force of the magnetic film. This relationship shows that it is essential for enhancing the line recording density to reduce the flux reversal width.

As can be also understood from the above relationship, the flux reversal width can be reduced by reducing the residual magnetism of the magnetic film and enhancing the coercive force of the magnetic film. However, an excessive reduction of the residual magnetism of the magnetic film results in a lower output of the head, so that the residual magnetism cannot be largely reduced. Also, the magnetic film is preferably thinner, however, it is limited to 0.04 to 0.06 μm due to manufacturing techniques. Therefore, the coercive force of the magnetic film should be enlarged to provide a sufficiently reduced flux reversal width or an enhanced line recording density. It is possible to provide a recording wavelength at 0.97 μm or less by employing a magnetic film having a coercive force of 1.8 kOe (kilo oersted) or more and a residual magnetism of approximately 15 kG (kilo gauss).

It is desirable to provide a lubricating film on the surface of a magnetic film of a thin-film magnetic disc to prevent the magnetic film from being abraded due to a contact with a magnetic head and being adhered with the magnetic head in an operating condition. If such lubricating film is too thick, the thickness of the film substantially forms a spacing which causes deterioration in recording and reproducing characteristics. Therefore, it is desirable to limit the thickness of the lubricating to 0.05 μm or less.

In the magnetic disc apparatus, a space necessary to levitate a thin-film magnetic head also affects the recording density. It is therefore desirable to reduce such levitation space to enhance the recording density. In the present invention, the levitation space is desirably 0.15 μm or less.

The magnetic disc apparatus of the present invention employs ordinary inductive-type thin-film magnetic heads and enables writing and reading of information. However, it is more preferable to employ an overwritable thin-film magnetic head, particularly, a magnetic head which enables an overwrite at −22 dB or less by the use of such thin-film magnetic head. When data is written at a minimum frequency $f_1$ and over-written by other data at a maximum frequency $f_2$, an output ratio of remaining data previously written at the frequency $f_1$ to the newly written data at the frequency $f_2$ is desirably −22 dB or less. If this ratio presents a value larger than −22 dB, a reproduced waveform is greatly influenced by the remaining previous data after the overwrite, which results in suddenly increasing errors. To improve reproducing characteristics of the magnetic disc apparatus, a waveform shaping circuit may be provided for shaping a reproduced waveform to generate a shape waveform, which results in extending a phase margin and reducing errors.

It is particularly desirable to employ the following structure as a thin-film magnetic head for the present invention. Specifically, a thin-film magnetic head comprises a bottom magnetic film, a top magnetic film deposited on the bottom magnetic film and having one end contacted with one end of the bottom magnetic film and the other end opposed to the other end of the bottom magnetic film with a magnetic gap therebetween to thereby form a magnetic circuit having a magnetic gap in a portion thereof together with the bottom magnetic film, and a conductive coil which crosses the magnetic circuit through the both magnetic film. Also, the thin-film magnetic head has a pole thickness which satisfies the following formula in a recording wavelength region from 0.3 to 0.97 µm:

$$P_T \cdot B_S \geqq \frac{(\sqrt{\lambda} + 3.6)(10\lambda - 4\sqrt{\lambda} + 8.6)}{13(2.5\sqrt{\lambda} - 1)}$$

where $P_T$ represents a pole thickness (µm), $B_S$ a saturated flux density of the top and bottom magnetic films (T), and $\lambda$ a recording wavelength (µm).

The present inventors and others have clarified that an overwrite characteristic is remarkably influenced by the product of a pole thickness of a thin-film magnetic head and a saturated flux density of a magnetic core material. They have also clarified that it is desirable that the product of the pole thickness and the saturated flux density of the magnetic core material be in a predetermined relationship as shown in the above formula to improve the overwrite characteristic. The above formula was deduced based on the results of measuring the overwrite characteristics of approximately 50 kinds of thin-film magnetic heads respectively having a different pole thickness and a different saturated flux density of the magnetic core material.

If a track width of the magnetic disc on which information is recorded is narrowed to increase a track density, the output of the thin-film magnetic disc is lowered in proportion to the track width. For this reason, the track width is preferably within a range of 1 to 10 µm. To compensate for such lowered output of the thin-film magnetic head, it is desirable to increase the number of coil turns of the thin-film magnetic head to generate a larger output. Specifically, the number of coil turns should be 10 turns or more, and preferably 17 turns or more.

The thin-film magnetic head is manufactured by depositing a magnetic film on a nonmagnetic substrate and finally forming the same in a slider shape. It is desirable to employ, as a substrate material, ceramics such as alumina, zirconia, silicon carbide, and a spinel construction type oxide, for example, $MgAl_2O_3$.

A load for pressing the thin-film magnetic head to a disc should be as light as possible for a better sliding movement, and a load of 10 g or less is particularly desirable.

It is desirable to mount a crown on an end surface of a slider of the thin-film magnetic head, particularly, on one of surfaces opposed to the thin-film magnetic disc. Such crown causes air vortex which is useful in levitating the thin-film magnetic head.

The shape of the slider of the thin-film magnetic head may be a positive pressure slider shape for debilitating a levitating force in the vicinity of the top end of a head core or a negative pressure slider shape having a contrary characteristic to the former.

It is desirable to employ, as a magnetic core material for the both top and bottom magnetic films of the thin-film magnetic head, a material having a high saturated flux density, particularly a saturated flux density of 1 T (tesla) or more. Such magnetic material includes nickel-iron crystalline represented by permalloy, cobalt series noncrystalline and crystalline and iron series noncrystalline and crystalline alloy. The top and bottom magnetic film may respectively comprise a multiple-layered structure. Such multiple-layered structure is formed by alternately stacking a magnetic film and a nonmagnetic film. For the nonmagnetic film, an insulating film made of alumina, silicon oxide or the like may be desirably employed. When the magnetic film and nonmagnetic film are alternately stacked, it is desirable that the respective films have a uniform thickness. However, difference in thickness of the films will not cause any trouble. The total number of layers in a film is two or more, that is, a film comprises at least two layers, i.e., a magnetic film layer and a nonmagnetic film layer. Such multiple-layered structure thus formed by alternate magnetic and non-magnetic films can reduce eddy current, which results in improving a magnetic permeability in a high frequency range as well as nearly forming a single magnetic domain. The multiple-layered structure is also effective in preventing magnetic walls from moving and accordingly stabilizing a reproduced output. Also, a magnetic material presenting a higher saturated flux density can generate a higher flux density and a stronger magnetic field, which results in improving the overwrite characteristic. The above-mentioned multiple-layered film may be formed by a sputtering method, a plating method or the like.

The magnetic disc apparatus of the present invention employs a read head and a write head, whereby it is possible to write information by an inductive-type thin-film magnetic head having a large pole thickness and read information by a thin-film magnetic head having a magnetic core with a high magnetic permeability. Such write and read operations can improve the overwrite characteristic and a read performance. If a read head is made of MR material, it is possible to enhance a ratio S/N of a remaining signal value N after an over-write to a newly written signal value S.

The thin-film magnetic head may be left in contact with a thin-film magnetic disc when the magnetic disc apparatus is inoperative and levitated when rotation of the thin-film magnetic disc is started. Alternatively, the magnetic head may be levitated before the magnetic disc apparatus is started and a levitation amount, that is, a space between the head and disc may be controlled when the rotating velocity of the disc reaches a predetermined value. Particularly, the latter method is desirable because it is suitable for suppressing abrasion between the thin-film magnetic disc and head.

A problem inherent to reading information by the thin-film magnetic head is "wiggle" which is also described in Official Gazette of Japanese Patent Application No. 58-194125. This "wiggle" refers to a phenomenon presenting irregular fluctuations in a reproduced output which causes a read error. To suppress this wiggle phenomenon, it is desirable to reduce the magnitude of the external magnetic field to 3 Oe or less.

Also, since the track width of the thin-film magnetic head is reduced to enhance the recording density, it is desirable to employ an embedded servo system in which positioning is not performed on the servo surface, and servo information is also written on a data surface.

The magnetic disc apparatus of the present invention is provided with thin-film magnetic discs for recording information thereon and thin-film magnetic heads for writing and reading information on and from the thin-film magnetic discs and is characterized by comprising one or more head disc assemblies including one or more the thin-film magnetic discs having a track density of 1800 tracks per inch or more and a line recording density of 70 kilobits per inch or more coaxially mounted on a rotating shaft, thin-film magnetic heads having a relationship between a pole thickness ($P_T$) and the saturated flux density ($B_S$) of the magnetic head cores expressed by $345 \geqq P_T \cdot B_S \geqq 3.5$ in a recording wavelength range between 0.3 and 0.97 μm. The upper limit value 345 μm·T of $P_T \cdot B_S$ is defined by a material used for the magnetic head cores and a manufacturing process of the magnetic heads. Preferably, a material has a saturated flux density ($B_S$) of approximately 2.3 T or less, and the pole thickness ($P_T$) is 150 μm or less from the point of view of the process. The lower limit value of 3.5 μm·T is given when the recording wavelength is at 0.97 μm, and it is preferable that the value $P_T \cdot B_S$ is increased as the recording wavelength is shorter.

Also, the magnetic disc apparatus of the present invention having thin-film magnetic discs and thin-film magnetic heads for writing and reading information on and from the thin-film magnetic discs is characterized in that one or more head disc assemblies comprised in the magnetic disc apparatus are each provided with one or more the thin-film magnetic discs coaxially mounted on a rotating shaft, the thin-film magnetic discs each have a track density of 1800 tracks per inch or more and a line recording density of 70 kilobits per inch or more, the thin-film magnetic heads satisfies a relationship among a pole thickness ($P_T$), a saturated flux density ($B_S$) of magnetic head cores and a recording wavelength (λ) expressed by the following formula in the recording wavelength (λ) ranging from 0.3 to 0.97 μm:

$$345 \geq P_T \cdot B_S \geq 4.3 - 0.8\lambda$$

and also disc rotating means is provided therein.

The right part "4.3−0.8λ" applied to the present invention is derived by linearly approximating the above formula. Particularly, in this formula, it is preferable to employ the same in a recording wavelength ranging from 0.5 to 0.97 μm.

Incidentally, if the recording wavelength λ is in a range between 0.3 and 0.5 μm, a formula "13.1−14.8λ" is preferable.

The present invention has clarified requirements which should be fulfilled by a magnetic disc apparatus having a recording capacity of 60 gigabytes or more, particularly, a recording capacity ranging from 60 to 120 gigabytes. Specifically, for putting magnetic disc apparatus having a recording density of 60 to 120 gigabytes to practical use, the following requirements are necessary:

(1) A surface recording density ranges from 120 to 900 megabits per square inch;
(2) Read and write are performed by thin-film magnetic heads which satisfies a relationship among a pole thickness ($P_T$), a saturated flux density ($B_S$) of the magnetic head core and a recording wavelength (λ) ranging from 0.3 to 0.97 μm expressed by the following formula:

$$P_T \cdot B_S \geq \frac{(\sqrt{\lambda} + 3.6)(10\lambda - 4\sqrt{\lambda} + 8.5)}{13(2.5\sqrt{\lambda} - 1)}$$

where $P_T$ represents a pole thickness (μm), $B_S$ a saturated flux density of the top and bottom magnetic films (T), and λ a recording wavelength (μm); and
(3) A data transfer velocity ranges from 6 to 9 megabytes per second.

Also, the present invention has clarified that, for enhancing the recording capacity of the magnetic disc apparatus, the line recording density and track density of the thin-film magnetic disc and disc rotating velocity play important roles in avoiding a longer diameter of the thin-film magnetic discs. The present invention has also investigated the relationship among these factors.

Probably, the present invention has investigated and clarified for the first time what constituents a large capacity magnetic disc apparatus having a recording capacity of 60 to 120 gigabytes should be provided with.

It is desirable to enhance the recording density of the magnetic disc apparatus to enhance the recording capacity without enlarging the magnetic disc apparatus in size.

The structure of the thin-film magnetic heads for writing and reading information on and from the thin-film magnetic disc is extremely important for enhancing the recording density of the thin-film magnetic disc.

Specifically, it is necessary to employ a thin-film magnetic disc having a coercive force for reducing the recording wavelength. The reason for this will be explained below. Generally, a signal resolution, which determines the performance of a magnetic disc apparatus, is largely affected by boundary portions of signal bits recorded on a magnetic disc, i.e., a magnetization transition width. Thus, for reducing the recording wavelength of the magnetic disc, this magnetization transition width must be also reduced. It is known that the magnetization transition width is roughly reciprocally proportional to the coercive force of the magnetic disc, so that in order to reduce the recording wavelength, it is necessary to sufficiently consider the coercive force together with a product of reminance and magnetic film thickness of the magnetic disc, a gap length and a levitating amount of the magnetic head, and so on.

Then, investigation was made as to a magnitude of the coercive force of the magnetic disc required to realize the recording wavelength defined by the present invention while ensuring a predetermined signal resolution. FIG. 1 shows the relationship between the coercive force and achievable minimum recording wavelength. It can be seen from this graph that the coercive force must be 1800 Oe or more for achieving 0.97 μm of the recording wavelength which is the target of the present invention. It is therefore found that the coercive force of the magnetic disc for realizing the present invention is preferably 1800 Oe or more. Corresponding to this, the magnetic field generated from the top end of the thin-film magnetic head is required to be enhanced. However, an excessively thick pole may result in deterioration in a track width working accuracy.

The present inventors and others have found that write and read with a high recording density thin-film magnetic disc can be achieved by employing a thin-film magnetic head which has a relationship among a pole thickness ($P_T$, unit: μm), a saturated flux density ($B_S$, unit: tesla) and a recording wavelength (λ) ranging from 0.3 to 0.97 μm expressed by the following formula:

$$P_T \cdot B_S \geq \frac{(\sqrt{\lambda} + 3.6)(10\lambda - 4\sqrt{\lambda} + 8.6)}{13(2.5\sqrt{\lambda} - 1)}$$

It is possible to make the pole thickness smaller as well as improve the track width working accuracy by employing a high saturation flux density material to the magnetic core so as to satisfy the above formula. As a result, a high recording density of the thin-film magnetic disc can be achieved.

Incidentally, it is effective in reducing or shortening the recording wavelength to reduce a levitating amount of the thin-film magnetic head with respect to the surface of the thin-film magnetic disc to approximate the head to the disc, or make the magnetic film of the thin-film magnetic disc thinner. Preferably, the thickness of the magnetic film is 0.06 μm or less.

Further, by providing the thin-film magnetic disc with a lubricating film of 0.05 μm or less in thickness formed on the surface thereof, the slidability of the thin-film magnetic head can be improved.

Even with an enhanced recording capacity, if the magnetic disc apparatus takes a longer time for a data than conventional low capacity apparatus, the merit of the enhanced recording capacity will be cancelled. For this reason, a higher data transfer velocity is necessary, for which the peripheral velocity of the thin-film magnetic disc is very important.

The present invention has fulfilled a magnetic disc apparatus having an extremely large recording capacity ranging from 60 to 120 gigabytes.

The present invention has also clarified thin-film magnetic heads and thin-film magnetic discs suitable for use in such large capacity magnetic disc apparatus.

DESCRIPTION OF THE PREFERRED EMBODIMENTS

Figure 1:
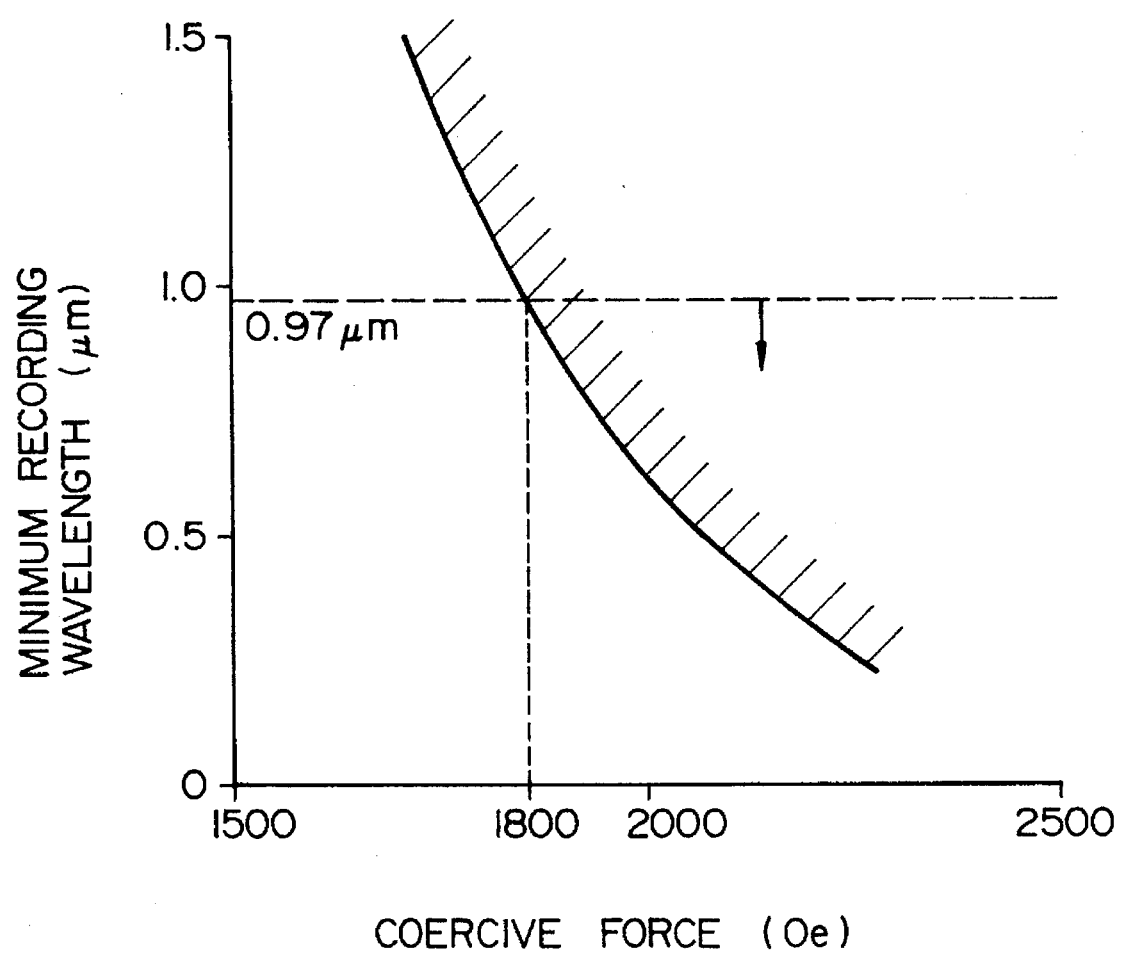
FIG. 1 is a graph showing the relationship between a coercive force and achievable minimum recording wave-length.
Figure 2:
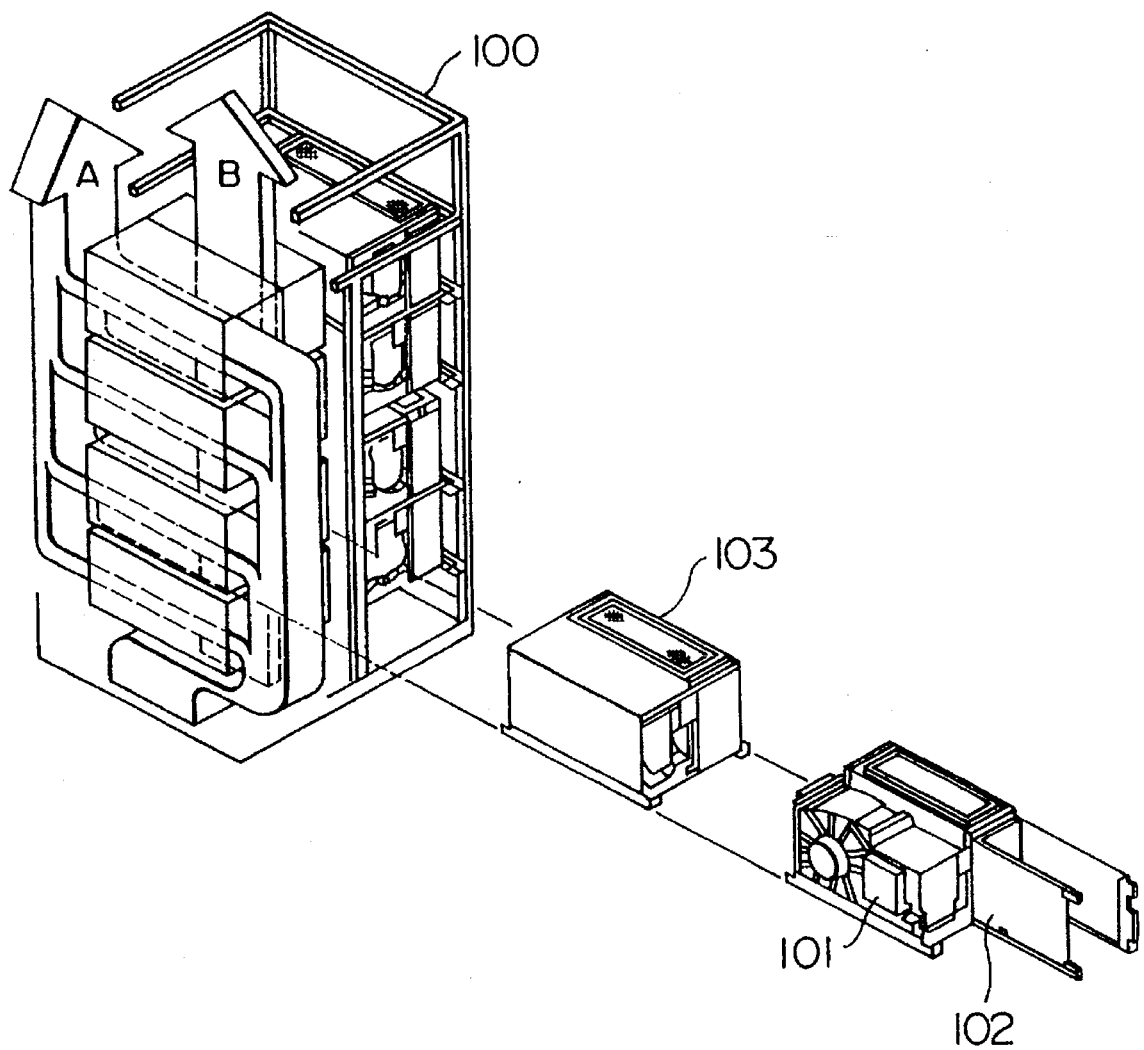
FIG. 2 is a perspective view schematically showing an embodiment of a magnetic disc apparatus according to the present invention.

FIG. 2 is a perspective view roughly illustrating an embodiment of a magnetic disc apparatus according to the present invention, where the magnetic disc apparatus is accommodated in a predetermined space.

A head disc assembly (HDA) 101 and an electronic circuit section 102 constitute a head disc assembly unit (HDU) 103 which is accommodated within a container 100. An interface (not shown) for communicating with a computer is also accommodated within the container 100. There are provided eight HDUs 103, which are divided into individual units and accommodated in four stages. The length of a side of the base of the container 100 ranges from 0.5 to 1.5 m, and the height of the same is approximately 2 m.

In FIG. 2, reference letters A and B indicate air flows for supplying magnetic heads and magnetic discs with clean air.

Figure 3:
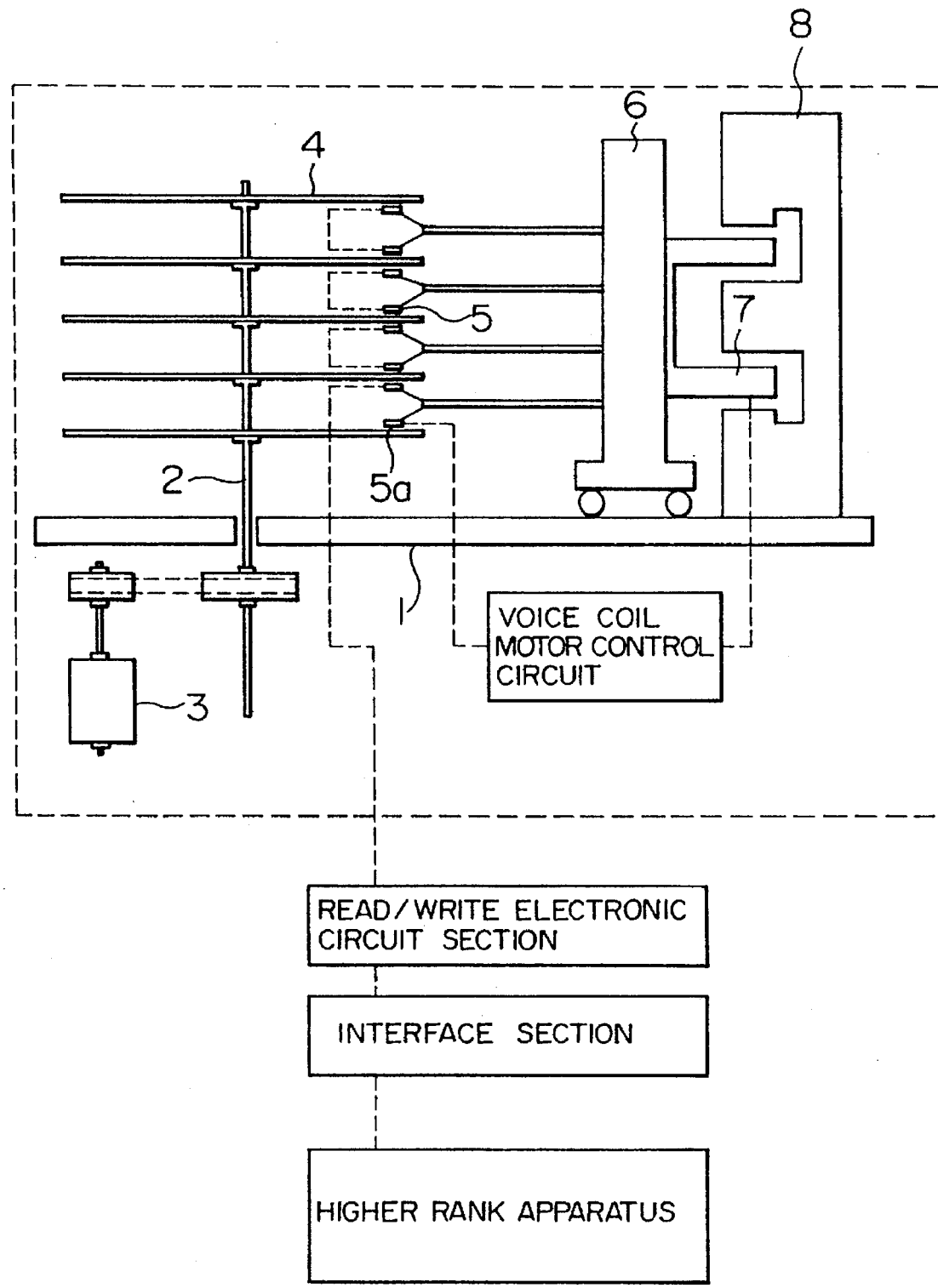
FIG. 3 is a schematic diagram showing a structure of the embodiment shown in FIG. 2.
Figure 4:
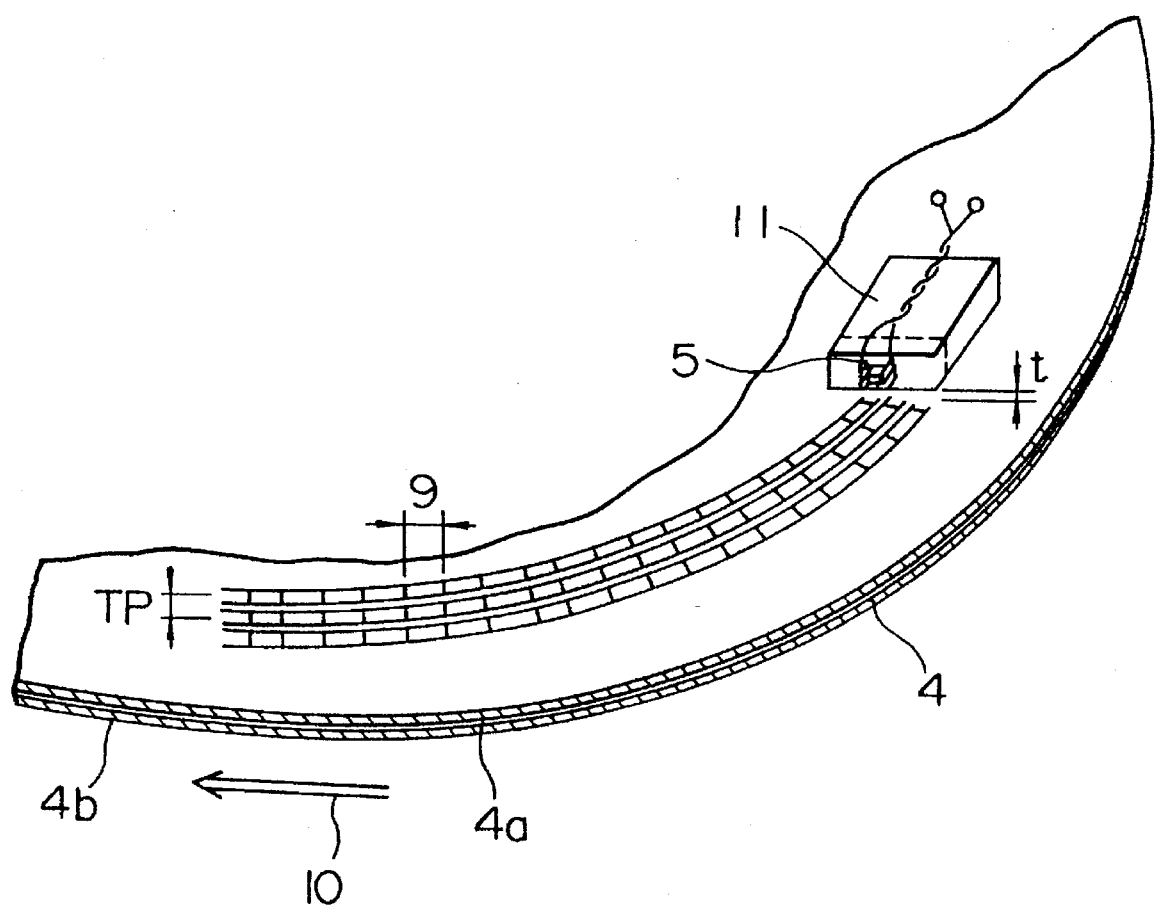
FIG. 4 is an enlarged perspective view showing the vicinity of a thin-film magnetic head shown in FIG. 2.

FIG. 3 is a diagram schematically showing the embodiment of the present invention. FIG. 4 is a perspective view in which a vicinity of one of thin-film magnetic heads 5 in FIG. 3 is shown in an enlarged scale.

Reference numeral 1 designates a base, and 2 a spindle. As shown in FIG. 3, a plurality of thin-film magnetic discs 4 are coaxially mounted on a single spindle. The thin-film magnetic discs 4 each comprise a nonmagnetic disc 4a made of aluminum or the like, which has one or both surfaces coated with a magnetic film 4b. The magnetic film 4b is provided with multiple track grooves. The surface recording density of each of the thin-film magnetic discs 4 is 120 to 900 megabits per square inch. It is desirable that the track density is 1800 track per inch or more, and the line recording density 70 kilobits per inch or more. And, within these ranges of the line recording density and the track density, it is desirable that the surface recording density, which is the product of the both, ranges from 120 to 900 megabits per square inch.

It is possible to enhance the recording density without remarkably enlarging the diameter of the thin-film magnetic disc by thus defining the surface recording density.

However, if the data transfer velocity becomes lower correspondingly to an enhanced recording density and therefore an enhanced information recording capacity, a utility value of the magnetic disc apparatus will be decreased. It should be noted that a data transfer velocity of 6 to 9 megabytes/second will enables a high-speed data access by the use of the above-mentioned large capacity magnetic disc apparatus. This data transfer velocity is determined by the peripheral velocity of the thin-film magnetic disc and the line recording density. Since the line recording density is defined as 70 kilobits per inch as mentioned above, a data transfer velocity of 6 to 9 megabytes/second is fulfilled by a disc rotating velocity equal to 3500 rpm or more in the case of thin-film discs having a diameter ranging from 3.5 to 11 inches. Such a disc rotating velocity of 3500 rpm is an ordinary velocity which is generally applied to magnetic disc apparatus, that the above-mentioned data transfer velocity can be readily fulfilled.

FIG. 3 shows an example of mounting five thin-film magnetic discs on a single spindle, however, the number of mounted thin-film magnetic disc is not limited to five. Alternatively, a plurality of such assemblies having a plurality of thin-film magnetic discs coaxially mounted on a single spindle may be provided.

Reference numeral 3 designates a motor for driving the spindle 2 to rotate the thin-film magnetic discs. Reference numeral 5 designates a magnetic head for data and 5a a magnetic head for positioning. Reference numeral 6 designates a carriage, 7 a voice coil and 8 a magnet. A voice coil motor is constituted of the voice coil 7 and the magnet 8. Also, a head positioning is performed by the elements 6, 7 and 8. The voice coil 7 is connected with the magnetic heads 5, 5a through a voice coil motor control circuit. In FIG. 3, a higher rank apparatus refers to, for example, a computer system.

A read/write circuit is adapted to identify information read and write operations and supplies the magnetic disc apparatus with signals, while an interface section is adapted to connect the higher rank apparatus with the magnetic disc apparatus. A system having such higher rank apparatus and magnetic disc apparatus refers to an information processing system.

Figure 12:
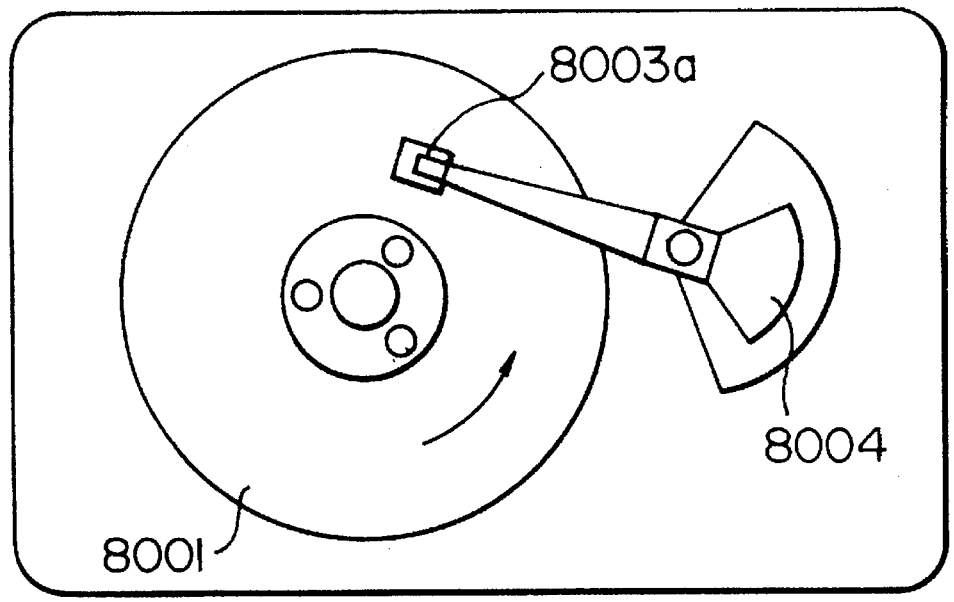
FIG. 12 is a plan view showing an embodiment of a magnetic disc apparatus according to the present invention.
Figure 13:
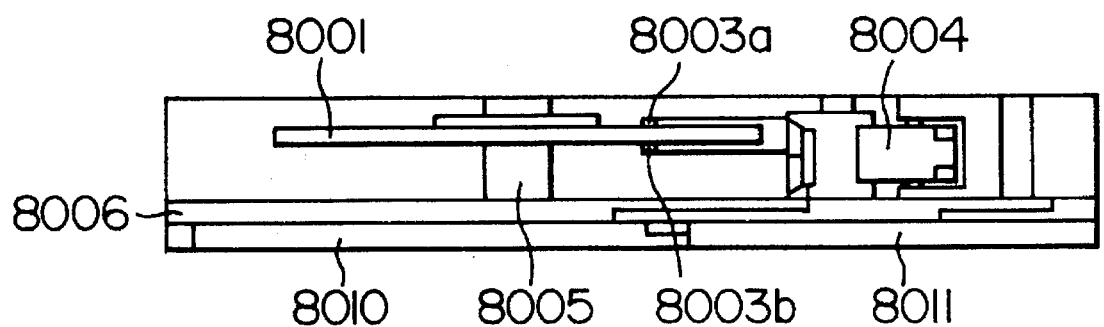
FIG. 13 is a side view of the magnetic disc apparatus of FIG. 12.

FIGS. 12 and 13 are schematic diagrams respectively showing an embodiment of the present invention which has a thin-film magnetic disc mounted on a spindle.

Reference numeral 8001 designates the thin-film magnetic disc. The surface recording density of the thin-film magnetic disc 8001 is 120–900 megabits per square inch. It is desirable that the track density is 1800 tracks per inch or more, and the line recording density is 70 kilobits per inch or more. On both sides of the thin-film magnetic disc 8001, thin-film magnetic heads 8003a, 8003b are disposed. The magnetic disc apparatus of this embodiment also includes a rotary actuator 8004 for positioning the thin-film magnetic heads 8003a, 8003b; a spindle direct-coupled motor 8005 for rotating the thin-film magnetic disc; a base 8006 of the magnetic disc apparatus; a signal processing circuit 8010; and an input/output interface 8011.

FIG. 4 is an enlarged view showing the thin-film magnetic head and thin-film magnetic disc. Reference numeral 11 designates a slider, 9 a recording wavelength, and 10 a disc rotating direction. Also, reference letter t designates a levitating amount of the thin-film magnetic head, and Tp a track pitch.

Generally, in a magnetic disc apparatus, new information may be written on a recording medium in which different information has been previously written. Such an operation is called "overwrite". In this event, previously written information is sensed as a noise with respect to newly written information. Therefore, it is required to generate a magnetic field necessary to magnetize the thin-film magnetic disc from the top end of the thin-film magnetic head for writing new information on the medium. This overwrite characteristic is important particularly for a large capacity magnetic disc apparatus.

The magnitude of a magnetic field generated from the top end of the thin-film magnetic head should be larger as a coercive force of the thin-film magnetic disc is stronger. To clarify this relationship, the present inventors have investigated a relationship between noise characteristics required to enable the magnetic disc apparatus to overwrite and the magnitude of a magnetic field generated from a magnetic head by the use of thin-film magnetic discs respectively having a different coercive force, and defined a relationship formula which indicates a condition for preventing the magnetic disc apparatus from malfunctioning.

Figure 11:
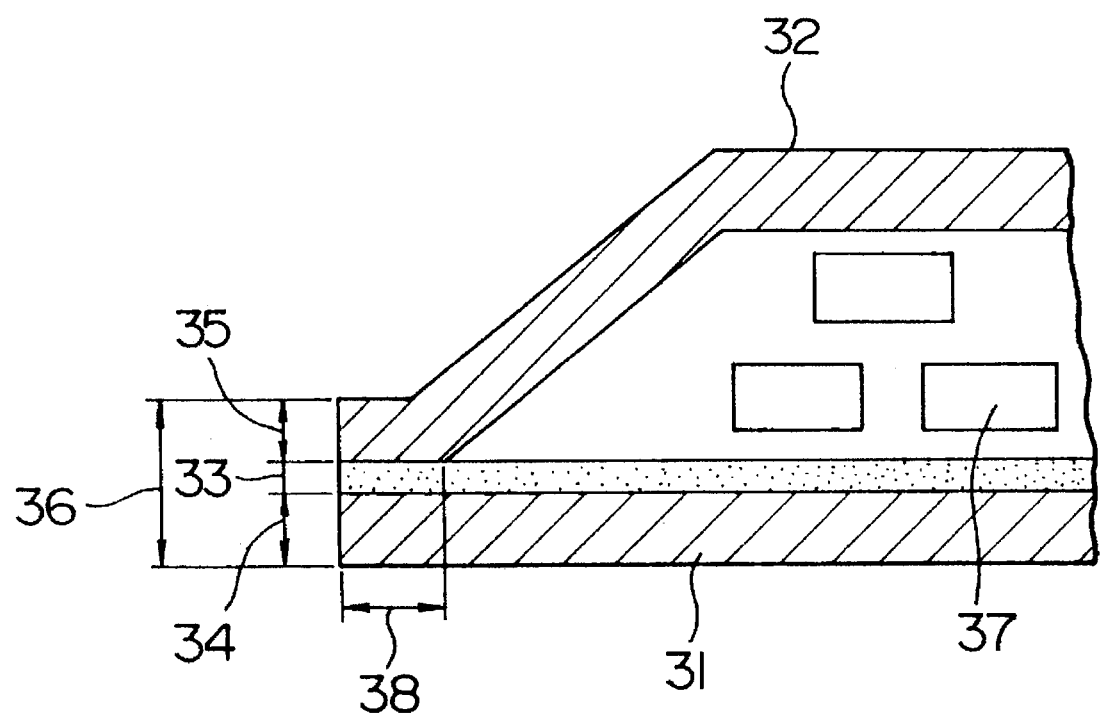
FIG. 11 is a cross-sectional view showing a top end portion of the thin-film magnetic head.

FIG. 11 schematically shows a structure of a top end portion of a magnetic core of the thin-film magnetic head employed in the magnetic disc apparatus of the present invention. Reference numeral 36 designates a pole thickness, and 38 a magnetic gap depth which refers to a length between a bottom magnetic film 31 and an upper magnetic film 32. These magnetic films 31, 32 are formed in parallel to each other at the tip of the core. Also, reference numeral 34 designates a thickness of the bottom magnetic film 31 facing the disc, 35 a thickness of the top magnetic film 32 opposite to the disc, 33 a gap length, and 37 a conductive coil. For a large capacity magnetic disc apparatus, a quite important aspect is an overwrite operation for directly writing new information on previously written information. In a new writing operation or an overwrite operation, previously written information remains as a noise for new information In this event, it is required to reduce the overwritten information to a small value below –22 dB.

Figure 5:
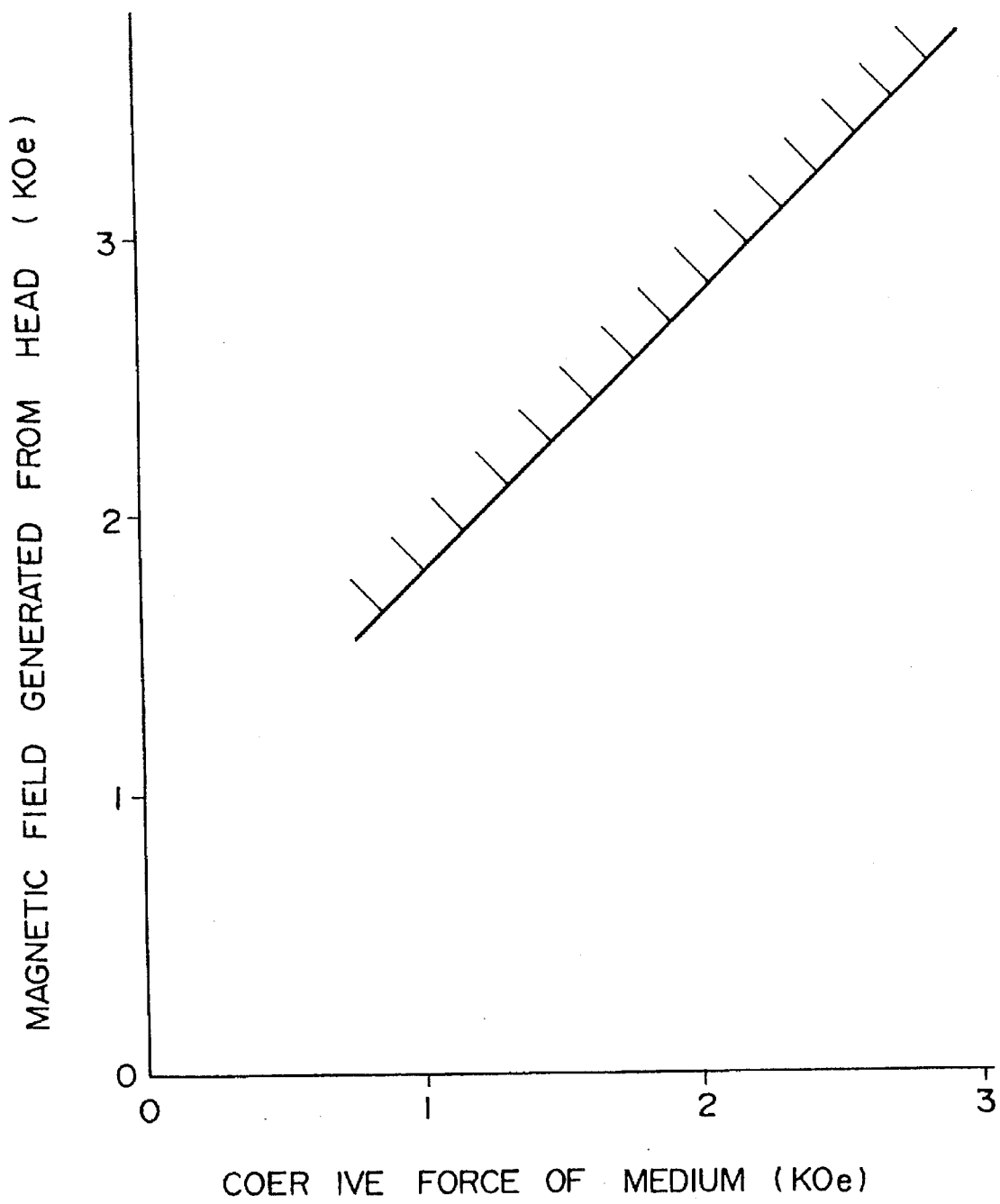
FIG. 5 is a characteristic graph showing the magnitude of a head magnetic field necessary to overwrite against a coercive force of a magnetic film on the thin-film magnetic disc.
Figure 6A:
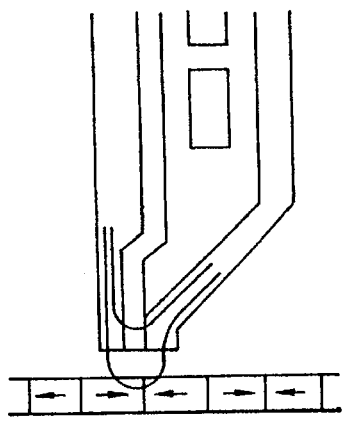
FIGS. 6A and 6B are explanatory diagrams showing a flow of magnetic flux at the top end of a head.
Figure 6B:
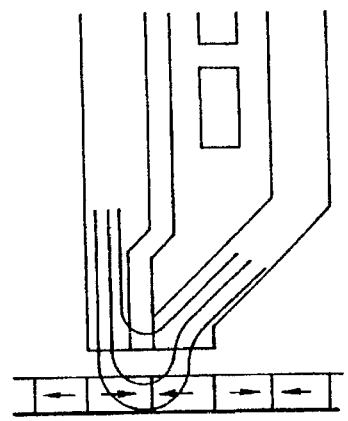

Given the above condition, a relationship between the coercive force of the thin-film magnetic disc and the magnitude of a magnetic field generated from the thin-film magnetic head was investigated with a thin-film magnetic disc medium (whose magnetic film is made by a sputtering method) having a recording wavelength of 0.68 µm, a levitation amount of 0.1 µm and a magnetic film thickness of 0.06 µm. FIG. 5 shows the relationship obtained from the investigation. From this result, it was found that the following formula should be satisfied for achieving a necessary overwrite characteristic:

$$Hx \geq Hc + 800$$

where Hx represents the magnitude of a magnetic field generated from a magnetic head, Hc a coercive force of the thin-film magnetic disc. It was also found that a larger pole thickness was important to enhance the magnitude of a magnetic field generated from a magnetic head so as to satisfy the above formula. This is because magnetic flux generated from the top end of a magnetic core toward a magnetic disc is stronger as the pole thickness is larger, as shown in FIGS. 6A, 6B.

The recording capacity of the magnetic disc apparatus is increased as the electronic computers are provided with higher performances. It should be noted that achieving improvement in the performance of the magnetic disc apparatus relies upon reduction of the recording wavelength.

Figure 7:
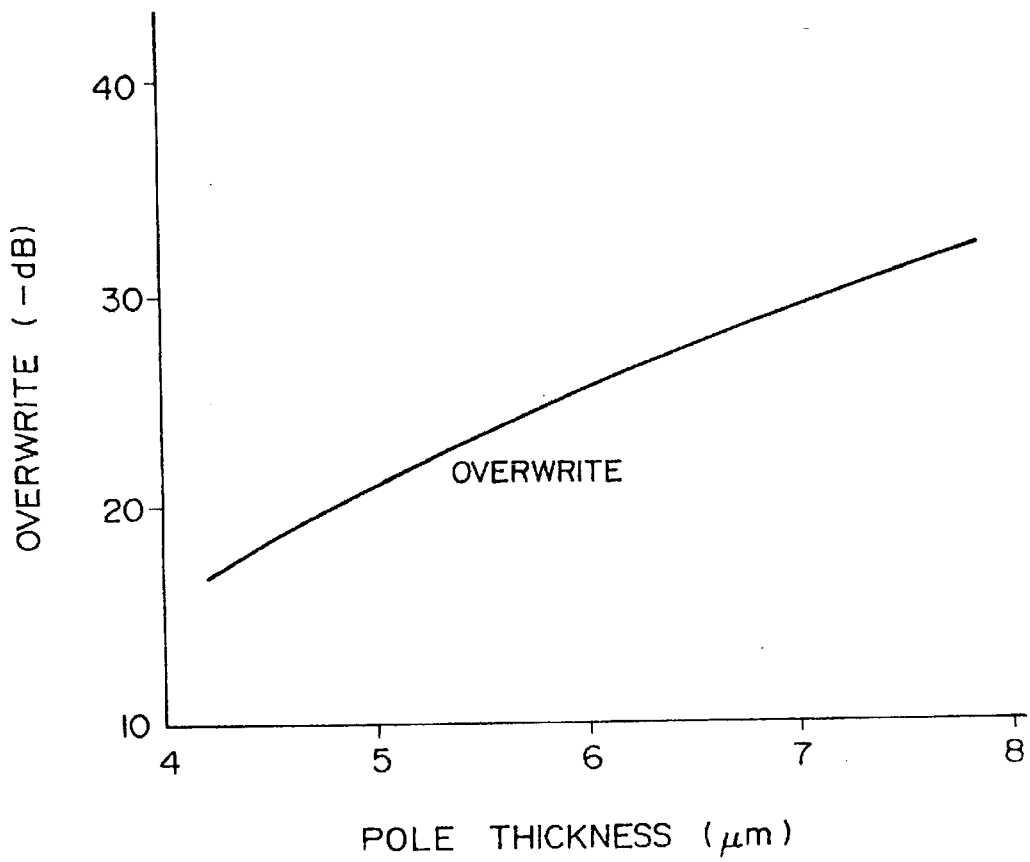
FIG. 7 is a characteristic graph showing a pole thickness dependency of overwrite and resolution characteristics.

Therefore, a relationship between the total length (pole thickness) of the thicknesses of the top and bottom magnetic films and the magnetic gap length and the overwrite characteristic was investigated with a recording wavelength at 0.68 µm and permalloy having a saturated flux density of 1 tesla as a magnetic core material for the thin-film magnetic head. The resulting relationship is shown in FIG. 7. It can be understood from FIG. 7 that a higher value of the overwrite characteristic is obtained as the pole thickness is increased. It is appreciated that, since the overwrite characteristic is required to be –22 dB or less as mentioned above, a necessary pole thickness is determined to be 5.5 µm or more from FIG. 7. Based on these results and also in consideration of fluctuations in the coercive force of the magnetic film deposited on the thin-film magnetic disc and the pole thickness, a pole length of 8.6 µm was employed as the thin-film magnetic head for a magnetic disc apparatus which satisfies write and read characteristics and has a recording wavelength at 0.68 µm.

Next, an investigation was also made on further reducing the recording wavelength to enhance the recording density. The result of this investigation has shown that it is necessary to decrease the magnetic gap depth as well as the gap length for making abrupt a writing magnetic field generated from the top end of the thin-film magnetic head. However, a further investigation directed by the above-mentioned aim has revealed that it is difficult to control the magnetic gap depth below approximately 1 µm by reasons related to the machining technique. Therefore, if the pole thickness is to be increased to fulfill a more abrupt recording magnetic field which cannot be provided only by controlling the magnetic gap depth, it will take a longer time to form thicker magnetic films of the thin-film magnetic head, and also an accuracy in machining a track width will be deteriorated. In other words, it is practically difficult to ensure a satisfactory overwrite characteristic when the recording wavelength is short. To attend to this problem, another investigation was made on application of high saturation flux density magnetic materials used for a magnetic core material in order to ensure a satisfactory overwrite characteristic and provide a margin for an accuracy in the magnetic gap depth.

The result shows that a high saturation flux density magnetic material with a high saturation flux density effectively increases the pole thickness ($P_T$) which is expressed by the following formula, in comparison with permalloy having a saturated flux density of 1 tesla:

$$P_T = \frac{\text{Highly saturated flux density}}{\text{Saturated flux density of permalloy (1 tesla)}}$$

It is understood from the above formula that, to ensure a satisfactory overwrite characteristic at the recording wavelength of 1 μm, a high saturation flux density magnetic material may be used for the magnetic core to reduce the thickness of the pole.

Next, an investigation was made on reduction of the magnetic gap length which is considered to be necessary to enhance the recording density, with the value $P_T$ fixed at 8.6 μm. The result of this investigation shows that a narrower magnetic gap length results in a more abrupt magnetic field distribution to a medium, however, a lower magnitude of the magnetic field. Therefore, it is effective to maintain the gap length between 0.2 and 0.4 μm, as has been investigated, in order to provide a large gap depth while keeping the overwrite characteristic below −22 dB.

Figure 8:
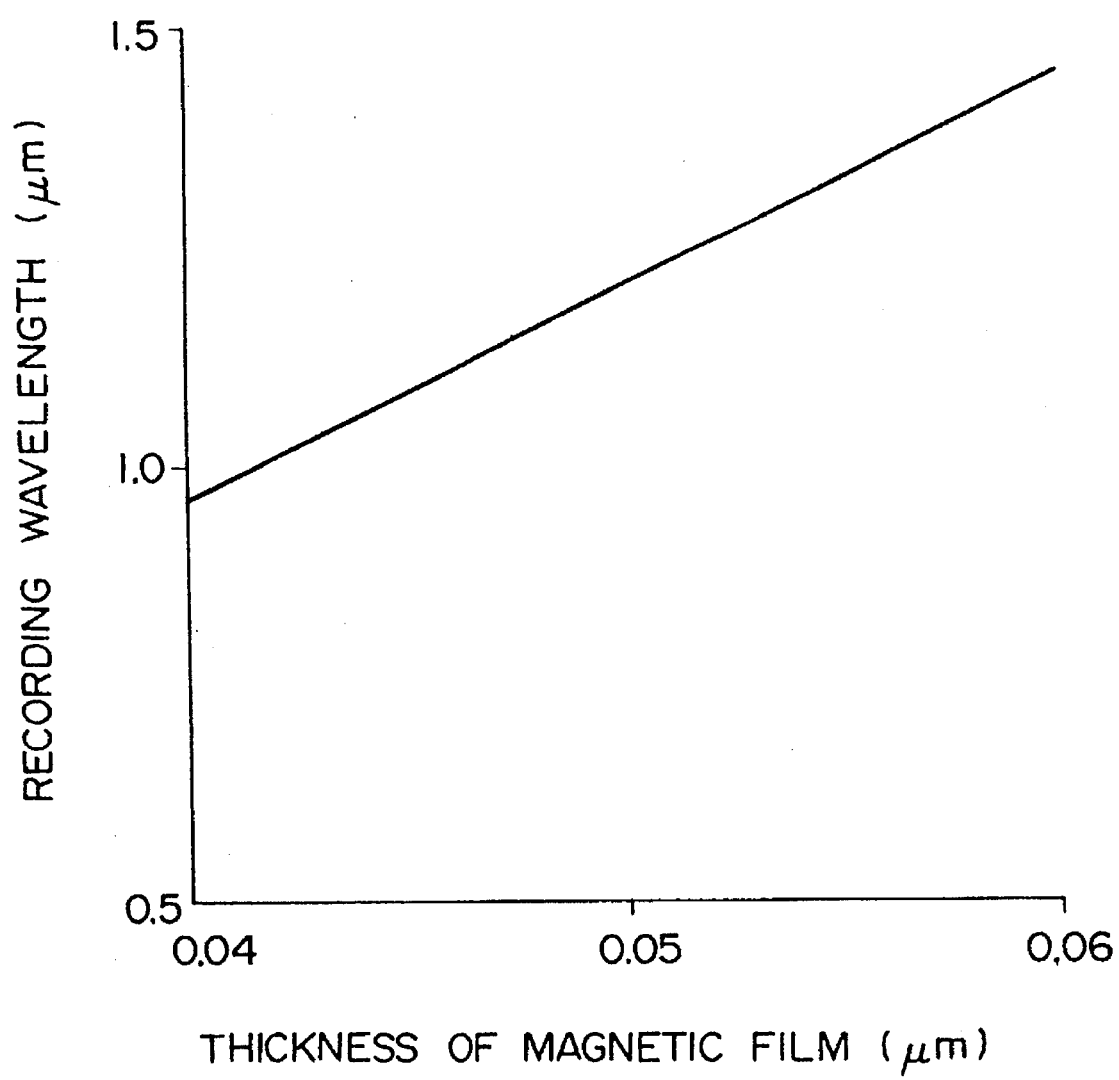
FIG. 8 is a characteristic graph showing the relationship between the thickness of a magnetic film on the thin-film magnetic disc and the recording wavelength.
Figure 9:
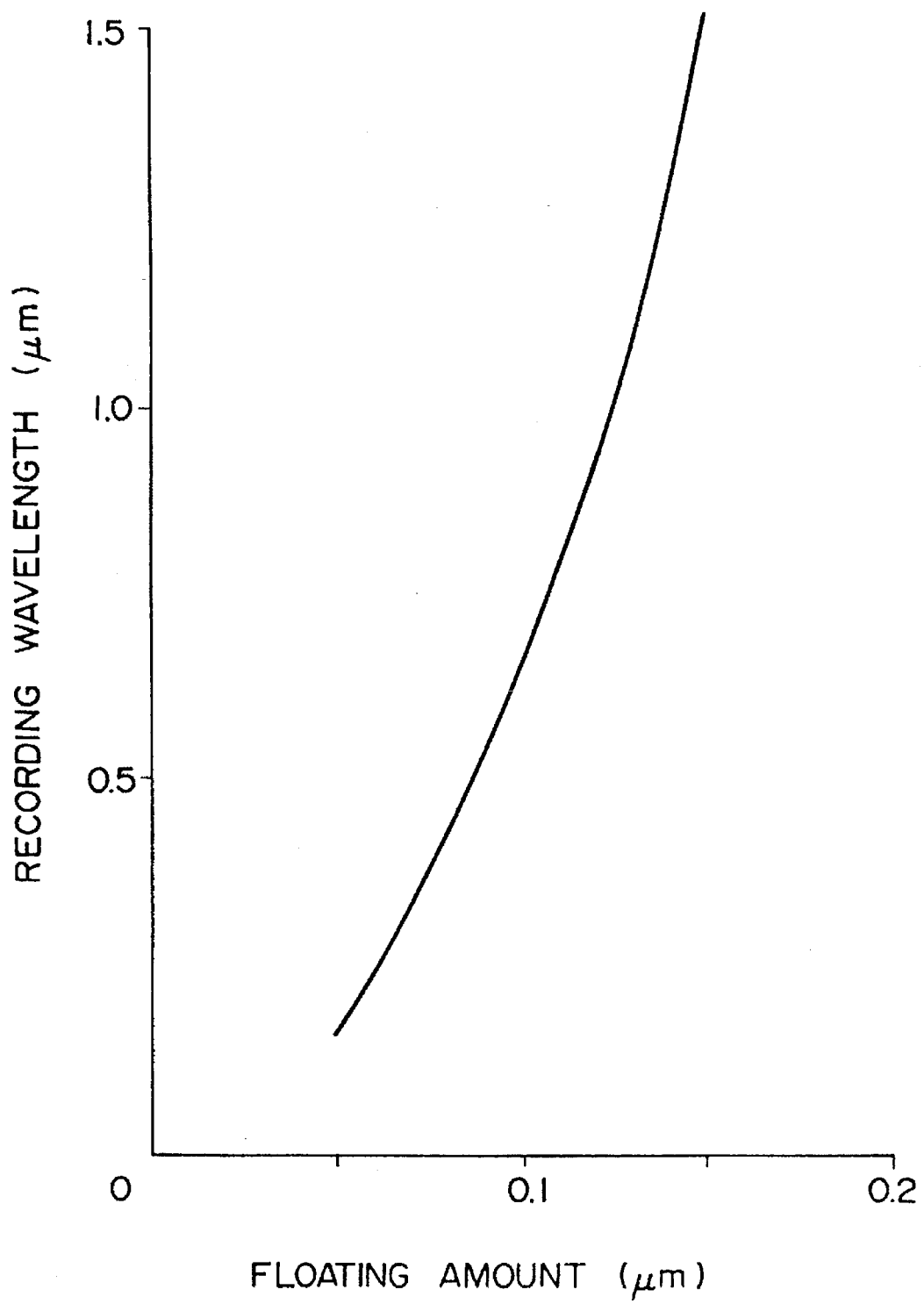
FIG. 9 is a characteristic graph showing the relationship between a levitating amount and the recording wavelength.

The situation of magnetic recording is determined by interaction of the magnetic medium and magnetic head. Therefore, a further investigation was made, employing a thin-film magnetic head having a pole thickness of 8.6 μm, on a relationship between a recording wavelength and the thickness of the magnetic film on the thin-film magnetic disc, which provides an overwrite characteristic of −22 dB or less, and a gap (levitation amount) between the thin-film magnetic disc and thin-film magnetic head, with an intention of estimating future improvement on the recording density. The results are shown in FIGS. 8, 9. FIG. 8 shows a relationship between the recording wavelength and the thickness of the magnetic film on the thin-film magnetic disc, while FIG. 9 shows a relationship between the recording wavelength and the gap (levitation amount) between the thin-film magnetic disc and thin-film magnetic head. It is understood from these graphs that the thickness of the magnetic film on the thin-film magnetic disc should be thinner and the levitation amount of the thin-film magnetic head should be reduced for providing a higher recording density. However, the thickness of the magnetic film, no matter how it is made as thin as possible, is limited to 0.04 to 0.06 μm in consideration of fluctuations occurring in the film forming process. Also, a minimum value of the levitation amount is limited to approximately 0.05 μm from a point of view of durability against a sliding movement. Thus, a minimum wavelength is determined to be 0.3 μm from the result shown in FIG. 9 corresponding to a minimum levitation space of 0.067 μm, or rounded to 0.7 μm, as shown in FIG. 9.

Next, a dependency of the levitation amount hg and the thickness $t_{mag}$ of the magnetic film on the thin-film magnetic disc will be discussed based on a recording wavelength of 0.68 μm, which is one of hitherto investigated recording wavelengths, a levitation amount of 0.1 μm, a magnetic film thickness of 0.04 μm and coercive force of 2500 Oe.

The levitation amount hg, assuming that a reference levitation amount is represented by hgo, is expressed as follows:

$$hg = hgo \cdot \sqrt{\frac{\lambda}{\lambda_b}}$$

where λ represents a recording wavelength and $\lambda_b$ the reference recording wavelength. The thickness $t_{mag}$ of the magnetic film on the thin-film magnetic disc is expressed by:

$$t_{mag} = t_{mago} \cdot \frac{\lambda}{\lambda_b}$$

A magnetic field magnitude Hx necessary to fulfill the overwrite characteristic of the thin-film magnetic head below −22 dB is expressed by:

$$Hx \propto \frac{P_T \cdot B_S}{(G_d + 2.1)(hg + t_{mag})}$$

Assuming that $G_d$=1 μm, the pole thickness $P_T$=8.6 μm with hg, $t_{mag}$ and λ being the reference values, and $B_S$=1 tesla, the following formula can be derived from the above relationship and the relationship between Hx and Hc:

$$P_T \cdot B_S \geqq \frac{(\sqrt{\lambda} + 3.6)(10\lambda - 4\sqrt{\lambda} + 8.6)}{13(2.5\sqrt{\lambda} - 1)}$$

Figure 10:
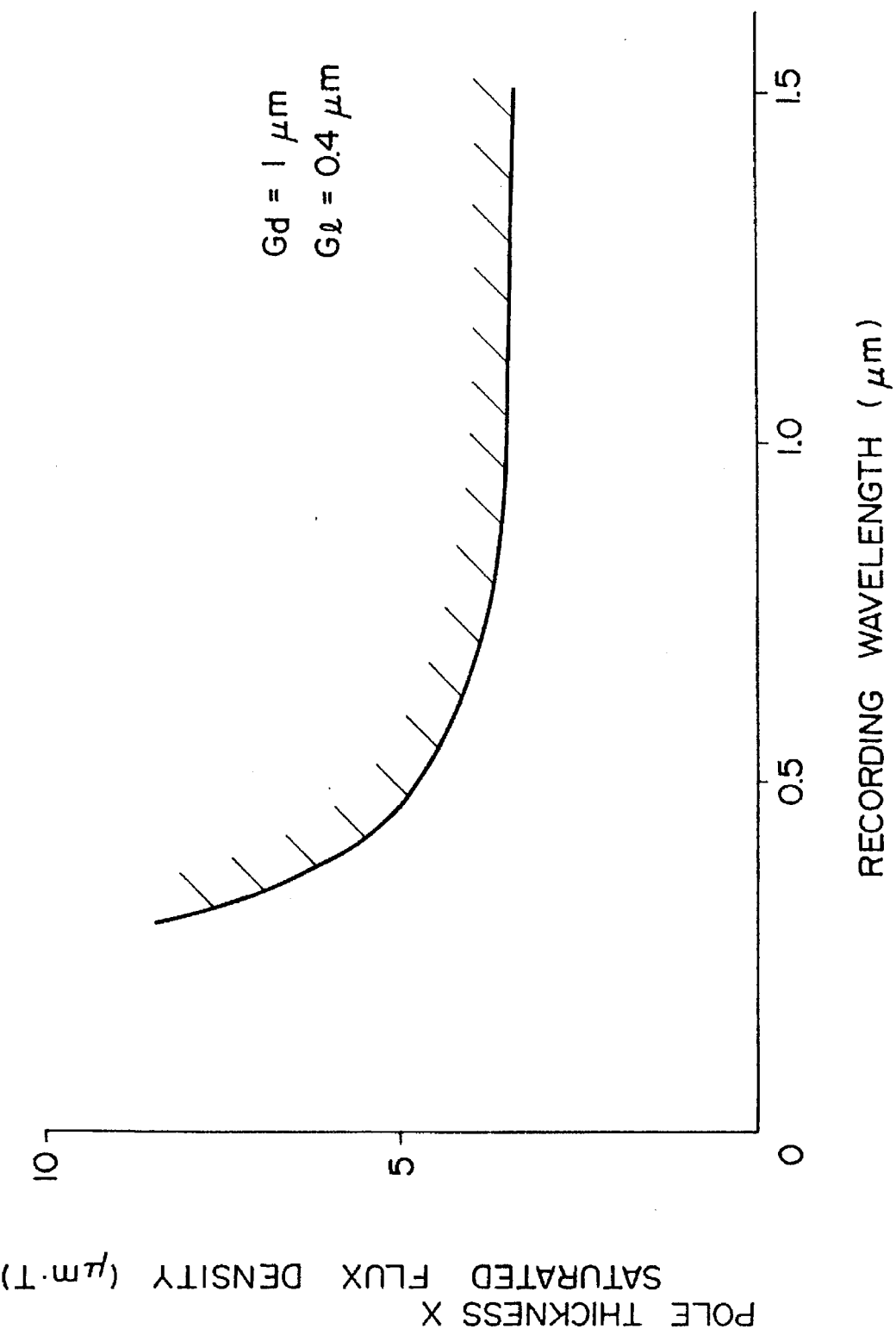
FIG. 10 is a characteristic graph showing the relationship between the product of a pole thickness of the thin-film magnetic head and a saturated flux density of a magnetic core material and the recording wave-length.

From this result, a relationship among the recording wavelength, which can provide the overwrite characteristic of −22 dB or less, and the product of the pole thickness and the saturated flux density of the employed magnetic core material was obtained. FIG. 10 shows a graph representing the resulting relationship. It was found that a high performance recording presenting the overwrite characteristic of −22 dB or less would be possible in a region above the characteristic curve.

Especially the high performance obtained under the above formula condition can be achieved when using high coercivity (more than 1800 Oe) media and small (less than 0.15 μm) levitation space, resulting in high signal resolution.

What is claimed is:

1. A magnetic disc apparatus comprising a plurality of discs each having a track density of 1800 tracks per inch or more and a line recording density of 70 kilobits per inch or more, a plurality of thin-film magnetic heads, means for moving said magnetic heads relative to said magnetic discs, and disc rotating means for rotating said magnetic discs, wherein a levitation space between said thin-film magnetic heads and said thin-film magnetic discs is between 0.07 μm and 0.15 μm during recording and a recording wavelength (λ) ranges from 0.3 to 0.97 μm, said thin-film magnetic discs each having a magnetic film with a coercive force in its magnetic disc of 1800 Oe or more, and said magnetic heads record information on said magnetic discs and the product of a saturated flux density ($B_S$) of magnetic head cores and a pole thickness ($P_T$) of each of said magnetic heads satisfies the following formula in said recording wavelength:

$$P_T \cdot B_S \geqq \frac{(\sqrt{\lambda} + 3.6)(10\lambda - 4\sqrt{\lambda} + 8.6)}{13(2.5\sqrt{\lambda} - 1)}$$

2. A magnetic disc apparatus according to claim 1, wherein said track density is 10 kilo tracks per inch or less.

3. A magnetic disc apparatus according to claim 1, wherein said line recording density is 220 kilo bits/inch or less.

4. A magnetic disc apparatus according to claim 1, wherein said magnetic discs each have a surface recording density of information recorded thereon ranging from 120 to 900 megabits/square inch.

5. A magnetic disc apparatus according to claim 1, wherein said magnetic discs each have a diameter ranging from 1.0 to 11 inches.

6. A magnetic disc apparatus according to claim 1, wherein said magnetic discs each have a track width ranging from 1 to 11 μm.

7. A magnetic disc apparatus according to claim 1, wherein the thickness of said magnetic film of each of said magnetic discs is 0.06 μm or less.

8. A magnetic disc apparatus according to claim 1, wherein said product of said saturated flux density ($B_S$) and said pole thickness ($P_T$) is 3.5 or more.

9. A magnetic disc apparatus according to claim 1, wherein said product of said saturated flux density ($B_S$) and said pole thickness ($P_T$) is 345 or less.

10. A magnetic disc apparatus according to claim 1, wherein said magnetic heads each have a number of coil turns ranging from 10 or more.

11. A magnetic disc apparatus according to claim 1, wherein said magnetic heads have a spring load of 10 g or less.

12. A magnetic disc apparatus according to claim 1, further comprising magnetic heads for reading out information recorded on said magnetic discs, said read out magnetic heads being MR heads.

13. A magnetic disc apparatus according to claim 1, wherein said magnetic head cores are formed by multiple layers having magnetic thin-film and non-magnetic thin-film.

14. A magnetic disc apparatus according to claim 1, wherein said saturated flux density ($B_S$) of said magnetic head cores is 1 tesla or more.

15. A magnetic disc apparatus according to claim 1, wherein said magnetic discs each include a lubricating film having a thickness of 0.05 μm or less on the surface thereof.

* * * * *